United States Patent [19]

Hesse

[11] Patent Number: 5,127,481
[45] Date of Patent: Jul. 7, 1992

[54] PERCUSSION BORING MACHINE FOR DESTRUCTIVE REPLACEMENT OF BURIED PIPELINES

[75] Inventor: Alfons Hesse, Lennestadt, Fed. Rep. of Germany

[73] Assignee: Tracto-Technik Paul Schmidt Maschinenfabrik KG, Lennestadt, Fed. Rep. of Germany

[21] Appl. No.: 662,768

[22] Filed: Feb. 28, 1991

[30] Foreign Application Priority Data

May 9, 1990 [DE] Fed. Rep. of Germany ....... 4014775

[51] Int. Cl.⁵ .................... E21B 11/02; F16L 1/028; F16L 55/26
[52] U.S. Cl. .................................. 175/295; 30/92.5; 175/296; 405/156; 405/184
[58] Field of Search .............. 405/154, 184, 156; 175/19, 22, 293, 296, 257, 295; 30/92.5

[56] References Cited

U.S. PATENT DOCUMENTS

| | | | |
|---|---|---|---|
| 3,181,302 | 5/1965 | Lindsay | 405/156 |
| 4,634,313 | 1/1987 | Robbins | 405/154 X |
| 4,648,746 | 3/1987 | Abinett | 175/19 X |
| 4,674,914 | 6/1987 | Wayman | 405/154 |
| 4,732,222 | 3/1988 | Schmidt | 175/22 |
| 4,738,565 | 4/1988 | Streatfield et al. | 405/154 |
| 4,848,964 | 7/1989 | Yarnell | 405/154 |
| 4,981,181 | 1/1991 | Hesse | 405/154 X |

Primary Examiner—Stephen L. Novosad
Attorney, Agent, or Firm—Akoo-Toren

[57] ABSTRACT

A percussion boring machine for destructive replacement of buried pipelines, having an opening-out cone at the back of the machine housing and cutters spaced in front of said cone, wherein the cutters form part of a breaking-up head slipped on to the housing and the opening-out cone is likewise slipped on to the housing.

4 Claims, 1 Drawing Sheet

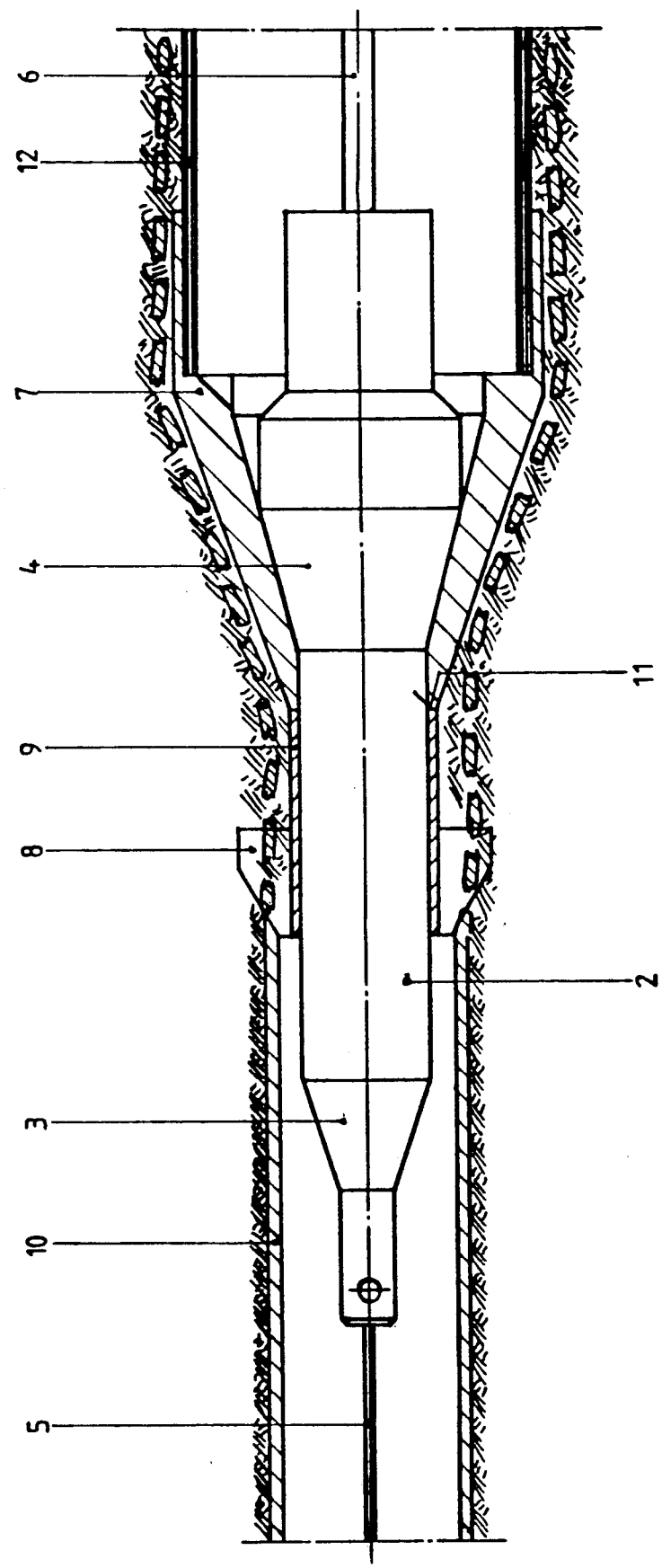

PERCUSSION BORING MACHINE FOR DESTRUCTIVE REPLACEMENT OF BURIED PIPELINES

TECHNICAL FIELD OF THE INVENTION

The invention relates to a percussion boring machine for the destructive replacement of buried pipelines, having an opening-out cone at the back of the machine housing and cutters spaced in front of said cone.

BACKGROUND OF THE INVENTION AND PRIOR ART

In German Patent No. 39 02 081 a percussion boring machine of this kind is described in which the cutters are arranged on a breaking-up head that is connected to the machine housing by a tension- and compression-resistant universal joint to enable it to follow curves.

Although the cutters that serve to break open the pipeline are thus located in front of the tip of the boring machine, the opening-out cone is located at the back of the housing and permanently connected to it.

The cutters on the breaking-up head can only be changed individually, or else the whole head must be detached from the machine at its universal joint and exchanged. While this kind of breaking-up head can be adapted to old pipes of different diameters, the opening-out cone is permanently connected to the machine housing, so that adaptation to the diameter of the pipe to be drawn in is only possible by the use of a percussion boring machine of corresponding diameter.

Finally the guidance of the machine is also unsatisfactory, particularly as it enters the pipe to be broken up, since the universal joint between the head and the machine allows deviation in all directions, so that an expensive mounting is required to guide the machine. A traction cable through the old pipe is also necessary.

OBJECT OF THE INVENTION

It is an object of the invention to provide a percussion boring machine for the destructive replacement of buried pipelines that can be reliably guided right from the start, can simply be adapted to the diameters of both the old and the new pipes and solves the problem of replacement of worn-out cutters.

SUMMARY OF THE INVENTION

To this end it is proposed in accordance with the invention to make the cutters in a machine of the above-mentioned type part of a breaking-up head that is slipped on to the housing, and likewise to slip the opening-out cone on to the housing. In this way both simple adaptation to the diameter of the pipe to be broken up and simple exchange of worn-out cutters are made possible. The breaking-up head can be slipped on and removed without difficulty. In the same way the opening-out cone can be slipped on to the housing of the boring machine and removed again, so that the breaking-up head and the opening-out cone can be removed from the machine independently of one another.

The breaking-up head may comprise a cylindrical sleeve with radial cutters.

A mounting for a follower pipe may be provided at the rear end of the opening-out cone, so that the breaking-up of the old pipeline takes place in the middle, cylindrical region of the machine housing, while the passage through the ground is widened by the opening-out cone arranged at the rear end of the housing and the remains of the old broken-up pipeline are forced away radially, so that a new pipe of larger diameter can be pulled in at the same time.

A particularly simple construction for the machine results when the cylindrical sleeve of the breaking-up head is supported on a front extension of the opening-out cone and extends forwards beyond the middle of the machine housing, and the cutters are arranged at the front end of the sleeve, spaced from the opening-out cone. In this case the cylindrical sleeve serves as a spacer between the cutters and the opening-out cone, which in turn is supported on a corresponding widening out of the machine housing. Arranging the cutters of the breaking-up head are located somewhat in front of the middle of the cylindrical housing provides a sufficient distance between the cutters and the opening-out cone, while a sufficient length of the cylindrical housing still projects forward from the breaking-up head to guide the machine in the old pipe.

BRIEF DESCRIPTION OF THE DRAWING

The invention will now be described in more detail, by way of example, with reference to an embodiment illustrated diagrammatically in the drawing, which shows the machine in side elevation advancing through an old pipe and pulling a replacement pipe behind it.

DETAILED DESCRIPTION OF A PREFERRED EMBODIMENT OF THE INVENTION

The percussion boring machine 1 comprises a cylindrical housing 2, a conical tip 3 and, at the back, a conical enlargement 4. A traction cable 5 passing through an old pipe 10 is attached to the conical tip 3. The rear end of the machine 1 is connected to a compressed air hose 6.

A replaceable opening-out cone 7 is seated on the conical end 4 of the machine 1. In addition a breaking-up head comprising radially-projecting cutters 8 and a cylindrical sleeve 9 is seated on the cylindrical housing 2. The sleeve 9 is supported at its rear end on a forward extension 11 of the opening-out cone 7.

The length of the cylindrical sleeve 9 is such that the cutters 8 located on its forward end are spaced sufficiently far from the opening-out cone 7 and lie in front of the middle of the machine 1.

A follower pipe 12 of larger diameter than the old pipe 10 being broken up is attached to the opening-out cone 7 by a mounting (not shown).

The cylindrical part of the machine 1 lying in front of the cutters 8 and having the conical tip 3 serves to guide the machine in the old pipe 10 being broken up, which is particularly important when the machine is being positioned at the start of the breaking-up process.

As the machine advances, the cutters 8 first engage with the old pipe 10 and break it up into small pieces under the blows exerted by the machine 1. The opening-out cone 7 at the end of the machine 1 then enlarges the hole enough for the follower pipe 12 to be introduced into the passage without any great amount of friction.

Since the breaking-up head comprising the cutters 8 and the cylindrical sleeve 9 is adapted to the diameter of the old pipe 10 to be broken up, which can be done by simply slipping on a suitable breaking-up head, the guidance of the machine 1 in the old pipe 10 can be improved still further if the cylindrical sleeve 9 is extended forwards with a diameter substantially corresponding to the internal diameter of the old pipe 10. This however is only necessary if the internal diameter of the old pipe 10 is substantially greater than the external diameter of the machine 1.

What is claimed is:

1. A percussion boring machine for destructive replacement of buried pipelines, comprising:

a machine housing;

an opening-out cone replaceably mounted at the back of the machine housing;

a breaking-up head replaceably mounted on the housing in front of said opening-out cone; and cutters spaced in front of said cone and forming part of said breaking-up head.

2. A machine according to claim 1 wherein the breaking-up head comprises a sleeve with a radial cutters.

3. A machine according to claim 2 wherein said sleeve is cylindrical and is supported on a front extension of the opening-out cone and extends forward beyond the middle of the machine housing, and the cutters are located at the front end of the sleeve and spaced from the opening-out cone.

4. A machine according to claim 2 wherein the sleeve is cylindrical and is supported on a front extension of the opening-out cone and extends forward beyond the middle of the machine housing, the cutter being located on the sleeve so as to be spaced from the opening-out cone and so that the sleeve extends forward beyond the cutters.

* * * * *